United States Patent
Freyermuth et al.

(10) Patent No.: US 10,458,503 B2
(45) Date of Patent: Oct. 29, 2019

(54) MOVABLE ELEMENT AND A DAMPING SYSTEM

(71) Applicant: SECO-E.P.B., Bouxwiller (FR)

(72) Inventors: Alain Freyermuth, Pfaffenhoffen (FR); Mathieu Ostermann, Allenwiller (FR); Yannick Groll, Reitwiller (FR); Pascal Krumhorn, Dauendorf (FR)

(73) Assignee: SECO-E.P.B., Bouxwiller (FR)

( * ) Notice: Subject to any disclaimer, the term of this patent is extended or adjusted under 35 U.S.C. 154(b) by 0 days.

(21) Appl. No.: 15/101,520

(22) PCT Filed: Nov. 28, 2014

(86) PCT No.: PCT/EP2014/076008
§ 371 (c)(1),
(2) Date: Jun. 3, 2016

(87) PCT Pub. No.: WO2015/082362
PCT Pub. Date: Jun. 11, 2015

(65) Prior Publication Data
US 2016/0305503 A1    Oct. 20, 2016

(30) Foreign Application Priority Data
Dec. 5, 2013 (FR) ...................................... 13 62155

(51) Int. Cl.
*F16F 7/10* (2006.01)
*B23Q 11/00* (2006.01)
*F16F 7/108* (2006.01)

(52) U.S. Cl.
CPC ........ *F16F 7/1028* (2013.01); *B23Q 11/0035* (2013.01); *F16F 7/108* (2013.01);
(Continued)

(58) Field of Classification Search
CPC .. F16F 7/10; F16F 7/1028; F16F 7/108; F16F 2222/02; F16F 2228/001; F16F 2228/04; F16F 2228/066; F16F 15/145; B23Q 11/0035; B23B 29/022; Y10T 408/76; Y10T 409/304312
See application file for complete search history.

(56) References Cited

U.S. PATENT DOCUMENTS 3,242,791 A * 3/1966 Smith ................... B23B 29/022
188/379
4,385,665 A 5/1983 Knoll
(Continued)

FOREIGN PATENT DOCUMENTS

EP    1128086 A2    8/2001
EP    2108473 A1    10/2009
(Continued)

*Primary Examiner* — Tomas W Irvin
(74) *Attorney, Agent, or Firm* — Corinne R. Gorski

(57) ABSTRACT

A movable element for a damping system includes an absorbent mass arranged to be positioned in a housing. At least two adapted portions are arranged on a periphery of the absorbent mass. A plurality of elastic elements are arranged in the adapted portions and are designed to bear against an internal wall of the housing. The elastic elements have optimum damping properties in different variation ranges of at least one parameter. The present invention further relates to a damping system.

14 Claims, 3 Drawing Sheets

Figure 1:
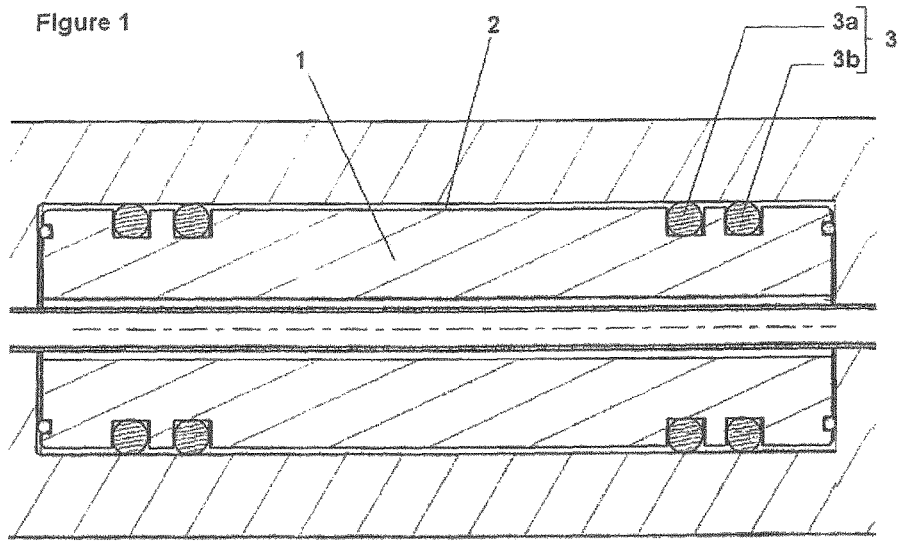

(52) U.S. Cl.
CPC ..... *F16F 2222/02* (2013.01); *F16F 2228/001* (2013.01); *F16F 2228/04* (2013.01); *F16F 2228/066* (2013.01)

(56) References Cited

U.S. PATENT DOCUMENTS

| | | | |
|---|---|---|---|
| 6,536,566 B2 * | 3/2003 | Hasegawa | B60G 13/16 188/378 |
| 7,661,912 B2 * | 2/2010 | Onozuka | B23B 29/022 188/322.5 |
| 8,308,404 B2 * | 11/2012 | Ostermann | B23B 29/022 408/143 |
| 8,899,891 B2 * | 12/2014 | Freyermuth | B23B 27/002 409/234 |
| 9,079,256 B2 * | 7/2015 | Freyermuth | B23B 31/02 |
| 9,533,357 B2 * | 1/2017 | Frota de Souza Filho | B23B 29/022 |
| 9,574,634 B2 * | 2/2017 | Lin | F16F 7/10 |
| 9,579,730 B2 * | 2/2017 | Frota de Souza Filho | B23B 29/022 |
| 10,113,608 B2 * | 10/2018 | Freyermuth | B23C 5/003 |
| 2006/0275090 A1 | 12/2006 | Onozuka | |
| 2009/0257838 A1 | 10/2009 | Ostermann et al. | |
| 2016/0312848 A1 * | 10/2016 | Freyermuth | B23Q 11/0035 |

FOREIGN PATENT DOCUMENTS

| | | |
|---|---|---|
| GB | 2322684 A | 9/1998 |
| JP | 2005186240 A | 7/2005 |

* cited by examiner

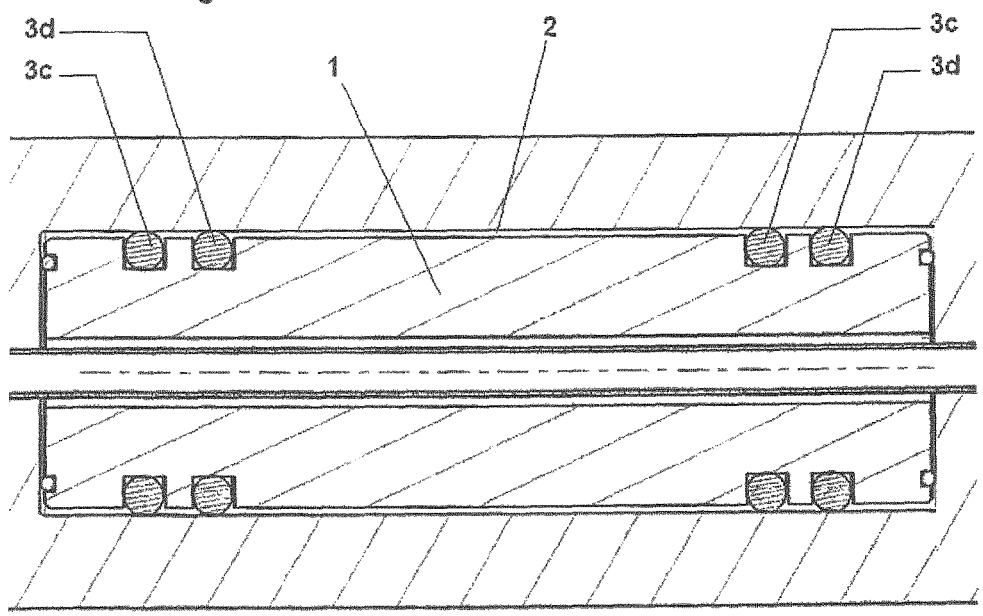
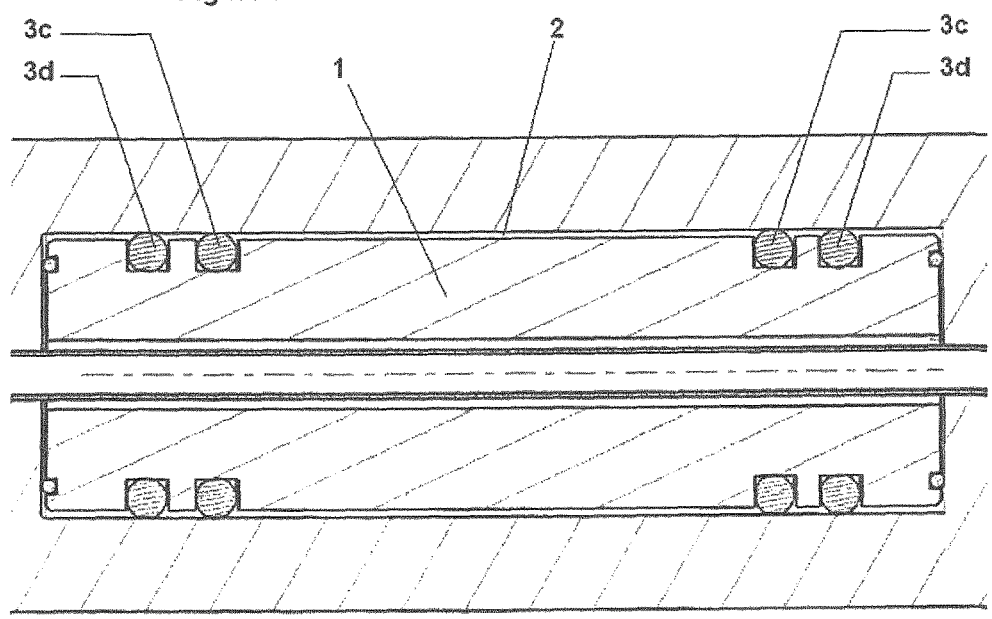

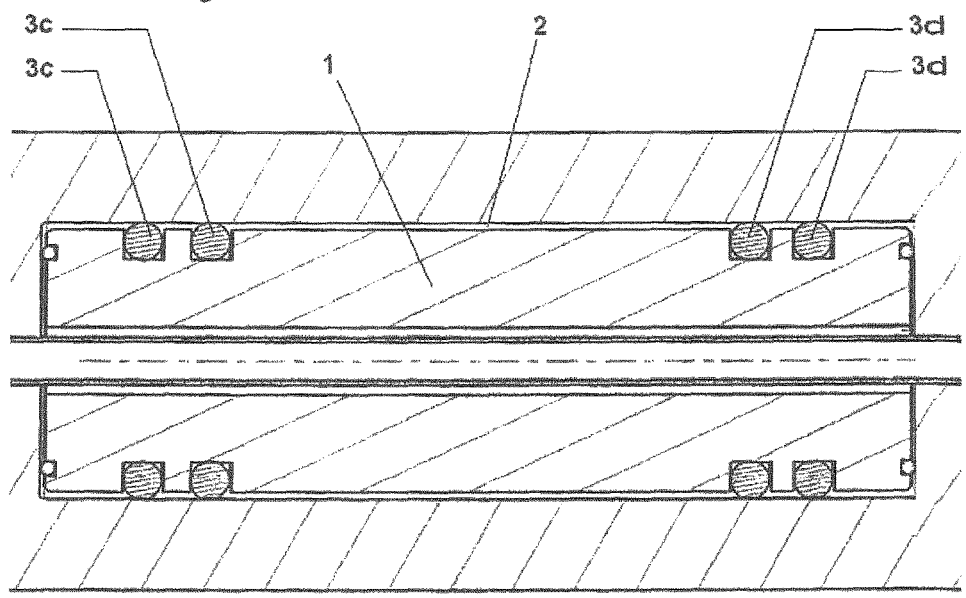

MOVABLE ELEMENT AND A DAMPING SYSTEM

RELATED APPLICATION DATA

This application is a § 371 National Stage Application of PCT International Application No. PCT/EP2014/076008 filed Nov. 28, 2014 claiming priority of FR Application No. 1362155, filed Dec. 5, 2013.

BACKGROUND AND SUMMARY

The present invention relates to the field of damping devices for apparatus and tools and more particularly to the field of adaptable damping devices for cutting and drilling apparatus and tools.

The mounting of tools onto an adapted interface of a motor-driven device often requires the insertion of an intermediate part designed to limit the vibrations of the moving device and tool. In the case of a tool that rotates, for example a cutting or drilling tool, vibrations can be caused by the resistance encountered by the cutting tool when in contact with the material of the cut piece. Said radial vibrations then interfere with the rotational movement of the cut part in relation to its axis of rotation. The intermediate damping device makes it possible to compensate for, even cancel out, the radial vibrations which may be produced by the tool in rotation.

Generally, said intermediate damping device is formed by a cylindrical part which forms a housing in which a centred cylindrical absorbent mass is located in the housing and held in position by elastic elements arranged on the periphery of the cylindrical mass in contact with an internal wall of the cylindrical housing. The function of this absorbent mass is to vibrate in a different phase to the cylindrical part of the housing and thus dampen the radial vibrations generated by cutting and in particular by the resistance encountered by the cutting tool. The damping device/cylindrical mass assembly is then arranged in alignment with the axis of rotation of the machine and the tool. The different elastic elements enable damping of the vibrational movements of the absorbent mass relative to the cylindrical part of the housing. Said damping can be controlled by modifying the elastic hardness of the elastic elements and by pre-stressing them.

However, the damping properties of said intermediate damping device are dependent on the operating conditions and functioning of the damping device. In addition, the quality of the damping optimisation may be affected by these influencing factors.

GB 2322684 relates to a damping mechanism housed in a propeller blade of a propulsion unit. The publication JP 2005 186240 shows to a damping mechanism.

The aim of the present invention is in particular to overcome these disadvantages by proposing a damping device in which the damping can be adapted to one or more factors extrinsic to the damping device and capable of influencing the damping properties of the device during functioning, at the same time ensuring an optimum force or optimised prestressing, which is regulated and controlled effectively by one or more elastomer elements.

Thus the subject matter of the invention is a movable element for a damping system comprising an absorbent mass designed to be positioned in a housing and comprising in the same area at least two adapted portions arranged on the periphery of the absorbent mass and in which respective elastic elements are arranged which are designed to bear against an internal wall of the housing, wherein said elastic elements have optimum damping properties in the different variation ranges of at least one parameter.

Another subject matter of the invention relates to a damping system integrating at least one movable axial element according to the invention.

Figure 2:
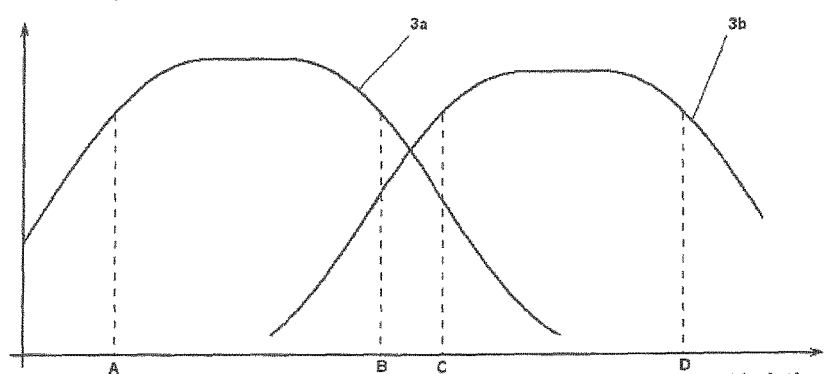
Figure 3:
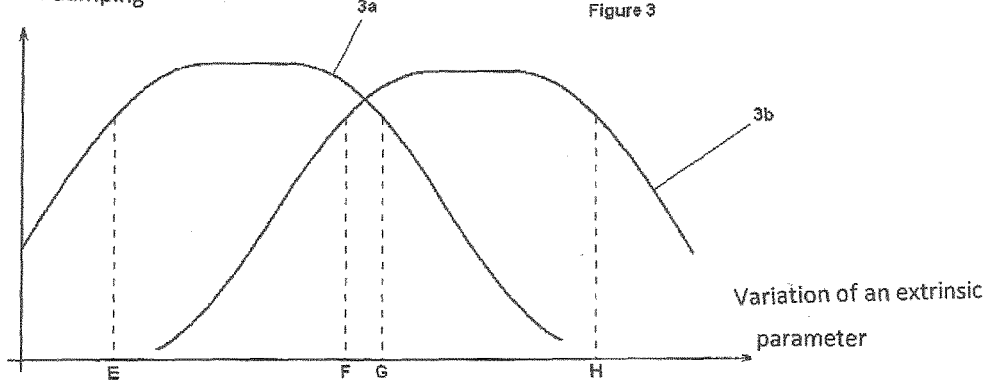

The invention is explained in more detail by means of the following description, which relates to a preferred embodiment given by way of a non-limiting example and explained with reference to the attached diagrammatic drawings in which:

FIG. 1 is a diagrammatic representation of an example of the movable axial element according to the invention, FIGS. 2 and 3 are two graphic representations illustrating respective examples of cooperation of the damping properties of different elastic elements of a movable axial element of the invention, FIGS. 4, 5 and 6 are diagrammatic representations of examples of arrangements of elastic elements of a movable axial element according to the invention.

In the present document the term "damping system" relates to the part or the assembly integrating a damping mass and designed to be mounted on a tool or a tool holder to enable damping.

The present invention relates to a movable element for a damping system comprising an absorbent mass 1 designed to be positioned in a housing 2 and comprising in the same area at least two adapted portions arranged on the periphery of the absorbent mass 1 and in which the respective elastic elements 3 are arranged which are designed to bear against the internal wall of the housing 2, wherein said elastic elements 3 have optimum damping properties in the different variation ranges of at least one parameter.

In the present document the term "optimum damping properties" relates to the damping properties which when quantified amount to damping of at least 30%, ideally a maximum damping of 50%, of the oscillations in an apparatus or a tool after a disturbance, and depending on the temperature conditions. In the present document the expression "in the same area" refers to relative closeness of adjacent elements as perceived by the skilled person, such as a space between two elements (3a, 3b; 3c, 3d; 3c, 3c; 3d, 3d) being not more than three times a cross-sectional dimension or diameter of one element. Preferably, such space is not more than one time the cross-sectional dimension or diameter of one element 3 as shown in the FIGS. 1 and 4-6.

The damping is in particular dependent on the intrinsic properties of the elastic elements 3 bearing on the periphery of the absorbent mass 1, for example and in a non-limiting manner the elasticity or viscosity.

The equipment of an absorbent mass 1 of a plurality of elastic elements 3, the different respective optimum damping properties of which according to the value of a parameter extrinsic to the assembly of the damping system, makes it possible to couple these different damping properties by enabling damping that is optimised by the system for a greater range of values of the extrinsic parameter under consideration.

Thus, according to one embodiment of a movable element according to the invention, the movable element is provided on the one hand with a first elastic element 3a the damping properties of which are optimum when the value of the extrinsic parameter is within a range A-B and on the other hand with a second elastic element 3b the damping properties of which are optimum when the value of the extrinsic parameter is within a range C-D, the values A-B and C-D can either follow one another or overlap one another partially. In addition, during its operation the movable element comprises at least one elastic element 3, the damping properties of which are optimum in the ranges of cumulative values. According to a preferred embodiment the values B and C are mixed up such that of its different elastic elements 3a and 3b the movable element comprises at least one elastic element 3, the damping properties of which are optimum over a continuous extended range between the values A and D.

Thus, if during the operation of the movable element, the extrinsic parameter, the value of which is initially between A and B, develops to a value between C and D, said movable element always comprises an elastic element 3 with optimum damping properties.

The respective damping properties of each of the elastic elements are obtained by means of the different compositions of each of these elements and/or by having different concentrations of elastomers. Examples of different designs of these elastic elements can be for example a particular arrangement of the elastic elements 3a and 3b on the absorbent mass as a function of their respective properties.

Thus, according to a first non-limiting example of the design, the movable element comprises a plurality of elastic elements. Said elastic elements are then arranged on the absorbent mass 1 according to their respective properties.

In the explanation of the examples, to avoid any confusion with regard to the properties of the elastic elements, the reference numerals of the latter have been substituted.

In this first embodiment some elastic elements 3c have low elasticity and high viscosity, whereas other elastic elements 3d conversely have high elasticity and low viscosity. The arrangement of the elastic elements 3c, 3d on the absorbent mass 1 is then performed by positioning elastic elements 3c with low elasticity and high viscosity at a first end of the absorbent mass 1 and elastic elements 3d with high elasticity and low viscosity at a second end, as illustrated in FIG. 6. An arrangement of this kind makes it possible to obtain an even distribution of the damping properties for different extrinsic parameters along the absorbent mass 1. During the damping operation, the absorbent mass 1 reacts in an identical manner at each of its ends as a function of the intrinsic properties of the elastic elements 3c, 3d located on the absorbent mass 1.

Thus, the movable element has elastic elements 3c, 3d positioned on the absorbent mass 1 such that the elastic elements 3c arranged in a first area located on a first side of the absorbent mass 1 have different properties from the elastic elements 3d arranged in a second area located on a second side of the absorbent mass 1.

According to a second embodiment the distribution of the properties of the elastic elements 3 is homogenised along the absorbent mass 1 of the movable element. Thus, the arrangement of the elastic elements 3c, 3d on the absorbent mass 1 is performed by positioning elastic elements 3c with low elasticity and high viscosity and elastic elements 3d with high elasticity and low viscosity in a symmetrical manner on the absorbent mass 1, as illustrated in FIG. 5. An arrangement of this kind provides compensation for the properties of different elastic elements 3 during the damping and a homogenous reaction of the absorbent mass 1 over its whole structure.

In addition, the movable element has elastic elements 3c, 3d with different properties in each area designed to receive elastic elements 3c, 3d on the absorbent mass 1, such that the assembly of said elastic elements 3c, 3d is arranged symmetrically on the absorbent mass 1 as a function of their respective properties.

Alternatively, according to third embodiment the movable element can be designed so that it has elastic elements 3c, 3d with different respective properties, said elastic elements 3c, 3d with different properties being arranged in each area designed to receive the elastic elements 3c, 3d on the absorbent mass 1 such that the assembly of said elastic elements 3c, 3d is arranged asymmetrically on the absorbent mass 1 as a function of their respective properties. An example of this embodiment is illustrated in FIG. 4.

According to a particular embodiment, the optimum variation ranges of a respective parameter of each of the elastic elements 3 are superimposed partially. This partial superimposing of optimum variation ranges thus makes it possible to form an optimum extended variation range for the elastic assembly formed by the different elastic elements 3 connected to one another.

Thus, according to another embodiment of a movable element according to the invention, the movable element is provided on the one hand with a first elastic element 3a the damping properties of which are optimal when the value of the extrinsic parameter is within a range of E-G and on the other hand a second elastic element 3b the damping properties of which are optimum when the value of the extrinsic parameter is within a range F-H, the values E, F, G and H being consecutive. In addition, during its operation the movable element comprises at least one elastic element 3, the damping properties of which are optimum for a value of the extrinsic parameter within the extended range between E and H. In the range formed by the parameter values F and G, the two elastic elements 3a and 3b together have optimum damping properties.

According to a first feature of the embodiment the elastic elements 3 have optimum damping properties in different temperature ranges.

According to a second feature of the invention the elastic elements 3 have optimum damping properties in different displacement frequency ranges.

According to a third feature of the invention the elastic elements 3 have optimum damping properties in different impact resistance ranges.

According to a fourth feature of the invention the elastic elements 3 have optimum damping properties in different humidity ranges.

According to a fifth feature of the invention the elastic elements 3 have optimum damping properties in different displacement amplitude ranges.

According to a non-limiting feature of the invention and according to the embodiment shown in FIG. 1, the movable element has an axial form and the adapted portions are formed by annular grooves arranged at least radially on the periphery of the absorbent mass 1.

The movable element can be connected to a cutting or drilling apparatus or a cutting or drilling tool, usually for adapted metal cutting.

Another subject matter of the invention relates to a damping system that comprises at least one movable axial element according to the invention.

Of course, the invention is not limited to the embodiment described and represented in the accompanying drawings. Modifications remain possible, particularly from the point of view of the design of the various elements or substituting equivalent techniques, without departing as such from the scope of protection of the invention.

The disclosures in French patent application No. 1362155, from which this application claims priority, are incorporated herein by reference.

The invention claimed is:

1. A movable element for a damping system comprising:
an absorbent mass arranged to be positioned in a housing of the damping system;
at least two adapted portions located in a same area and arranged on a periphery of the absorbent mass; and
elastic elements arranged in the at least two adapted portions and bearing against an internal wall of the housing, each of the elastic elements having optimum damping properties in different variation ranges of at least one parameter, an elastic element being arranged on a first one of the at least two adapted portions of the absorbent mass and having different damping properties from another of the elastic elements arranged on a second one of the at least two adapted portions of the absorbent mass, a space between two of the elastic elements being not more than three times a cross-sectional dimension or diameter of one elastic element of the two elastic elements.

2. The movable element according to claim 1, wherein the optimum variation ranges of a respective parameter of the elastic elements are superimposed partially.

3. The movable element according to claim 1, wherein the elastic elements each have optimum damping properties in different temperature ranges.

4. The movable element according to claim 1, wherein the elastic elements each have optimum damping properties in different displacement frequency ranges.

5. The movable element according to claim 1, wherein the elastic elements each have optimum damping properties in different impact resistance ranges.

6. The movable element according to claim 1, wherein the elastic elements each have optimum damping properties in different humidity ranges.

7. The movable element according to claim 1, wherein the elastic elements each have optimum damping properties in different amplitude displacement ranges.

8. The movable element according to claim 1, wherein the movable element has an axial form and the adapted portions are formed by annular grooves arranged at least radially on the periphery of the absorbent mass.

9. The movable element according to claim 1, wherein the movable element is connected to a cutting or drilling apparatus or a cutting or drilling tool.

10. A damping system comprising a movable element according to claim 1.

11. A movable element for a damping system comprising:
an absorbent mass arranged to be positioned in a housing of the damping system, the absorbent mass including at least two adapted portions arranged in a first area on a periphery of the absorbent mass and at least two adapted portions arranged in a second area on the periphery of the absorbent mass; and
elastic elements arranged in the at least two adapted portions in the first and second areas and bearing against an internal wall of the housing, each of the elastic elements in a same area having optimum damping properties in different variation ranges of at least one parameter, at least two elastic elements being arranged in the adapted portions of the first area located on a first side of the absorbent mass and at least two elastic elements being arranged in the adapted portions of the second area located on a second side of the absorbent mass, a space between two of the elastic elements in the same area being not more than three times a cross-sectional dimension or diameter of one elastic element of the two elastic elements, wherein at least one of the elastic elements has different properties from another one of the elastic elements in the same area, the elastic elements with different properties being arranged in each of the at least two adapted portions in each of the first and second areas such that the elastic elements are arranged asymmetrically on the absorbent mass as a function of their respective properties.

12. A damping system comprising a movable element according to claim 11.

13. A movable element for a damping system comprising:
an absorbent mass arranged to be positioned in a housing of the damping system, the absorbent mass including at least two adapted portions arranged in a first area on a periphery of the absorbent mass and at least two adapted portions arranged in a second area on the periphery of the absorbent mass; and
elastic elements arranged in the at least two adapted portions in the first and second areas and bearing against an internal wall of the housing, each of the elastic elements in a same area having optimum damping properties in different variation ranges of at least one parameter, at least two elastic elements being arranged in the first area located on a first side of the absorbent mass and at least two elastic elements being arranged in the second area located on a second side of the absorbent mass, a space between two of the elastic elements in the same area being not more than three times a cross-sectional dimension or diameter of one elastic element of the two elastic elements, wherein at least one of the elastic elements has different properties from another one of elastic elements in the same area, the elastic elements with different properties being arranged in each of the at least two adapted portions in each of the first and second areas such that the elastic elements are arranged symmetrically on the absorbent mass as a function of their respective properties.

14. A damping system comprising:
a housing having an internal wall; and
at least one movable axial element, the movable element including an absorbent mass positioned in the housing of the damping system, the absorbent mass including at least two adapted portions arranged in a first area on a periphery of the absorbent mass and at least two adapted portions arranged in a second area on the periphery of the absorbent mass; and
elastic elements arranged in the at least two adapted portions in the first and second areas and bearing against the internal wall of the housing, each of the elastic elements in a same area having optimum damping properties in different variation ranges of at least one parameter, at least two elastic elements being arranged in the first area located on a first side of the absorbent mass and at least two elastic elements on a second side of the absorbent mass, a space between two of the elastic elements in the same area being not more than three times a cross-sectional dimension or diameter of one elastic element of the two elastic elements, wherein at least one of the elastic elements has different properties from another one of elastic elements in the same area, the elastic elements with different properties being arranged in each of the at least two adapted portions in each of the first and second areas such that the elastic elements are arranged symmetrically on the absorbent mass as a function of their respective properties.

* * * * *